United States Patent [19]
Wolf

[11] Patent Number: 5,679,991
[45] Date of Patent: Oct. 21, 1997

[54] ECCENTRIC-AND-OSCILLATOR ENGAGEMENT STRUCTURE

[75] Inventor: Jürgen Wolf, Kriftel, Germany

[73] Assignee: Braun Aktiengesllschaft, Kronberg, Germany

[21] Appl. No.: 346,547

[22] Filed: Nov. 29, 1994

[30] Foreign Application Priority Data

Dec. 4, 1993 [DE] Germany .................. 43 41 392.7

[51] Int. Cl.$^6$ .................................................. H02K 7/06
[52] U.S. Cl. .................. 310/80; 310/37; 74/50
[58] Field of Search .................. 310/80, 36, 37, 310/38, 40.5, 47, 50, 20, 28; 74/50

[56] References Cited

U.S. PATENT DOCUMENTS

| | | | |
|---|---|---|---|
| 1,952,341 | 3/1934 | Ude | 172/126 |
| 3,992,778 | 11/1976 | Urbush | 30/216 |
| 4,265,131 | 5/1981 | Grover | 74/89.16 |
| 4,437,808 | 3/1984 | Londos et al. | 414/667 |
| 4,603,593 | 8/1986 | Clegg | 74/50 |

FOREIGN PATENT DOCUMENTS

| | | | |
|---|---|---|---|
| 563799 | 11/1932 | Germany | 74/50 |
| A-24 29 539 | 6/1974 | Germany . | |
| A-36 31 120 | 9/1986 | Germany | B26B 19/28 |
| 4-82586 | 3/1992 | Japan | B26B 19/28 |

*Primary Examiner*—Steven L. Stephan
*Assistant Examiner*—Jonathan Link
*Attorney, Agent, or Firm*—Fish & Richardson, P.C.

[57] ABSTRACT

The invention is directed to a device for converting a circular motion into a reciprocating motion, which provides for improved guiding of a drive pin arranged on an eccentric within a slide slot of a drive member. The slide slot is bounded by at least two flexurally elastic portions whose respective first end is not deflectable by the drive pin, whilst the area towards the respective second end is deflectable. The two portions extend parallel to each other in opposite directions.

16 Claims, 3 Drawing Sheets

5,679,991

ECCENTRIC-AND-OSCILLATOR ENGAGEMENT STRUCTURE

This invention relates to a device for converting the rotary motion of an eccentric driven by a motor shaft into a reciprocating motion parallel to a first direction (y–y') according to the prior-art portion of patent claim 1.

Such devices for converting the rotary motion of an eccentric into a reciprocating motion are employed in numerous appliances, in particular in electrically powered small appliances. Customary applications include the generation of reciprocation of a cutter assembly in a shaver or the translational motion of the toothbrush of a dental cleansing device. In such arrangements, the converter device is directly or indirectly connected to an implement such as a cutter assembly or a toothbrush attachment.

From JP 4-82586 (82586/92) a device according to the prior-art portion of patent claim 1 is known. This device includes a rigid plate acting as drive member which is in engagement with the eccentric in that a drive pin arranged on the eccentric engages a slide slot provided on the drive member.

The slide slot is formed by two parallel, yet relatively spaced, arms of a fork having their respective first ends secured to the drive member while their respective second ends point in a direction away from the rigid plate. In this device, the first and second ends of the fork arms lie opposite each other, forming a slide slot open on one end. The facing surfaces of the fork arms provide the boundary surface of the slide slot along which the drive pin rolls. With the eccentric rotating, the pressure which the drive pin exerts on the first fork arm causes the drive member to be deflected in a first direction y, and following the reversal of motion related to the direction y, the drive pin urges the second fork arm—and thus the drive member—into the opposite direction y', thus resulting in the reciprocating motion of the drive member parallel to a first axis y–y'. Thus, the circular motion of the eccentric is transmitted by the rolling motion of the pin along the boundary surfaces of the slide slot and converted into a translational motion.

The fork arms of this converter device are at such a relative distance as to receive the drive pin between them with a predetermined amount of bias or clamping force. To this effect, the fork arms carry flexurally elastic portions—referred to as spring and cushioning means in JA 4-82586—whose ends are connected to the rigid plate and to the free end of the fork arms. The clamping force acts at its highest level when the drive pin is between the two first ends of the fork arms, it is at its lowest when the pin is between the two second ends of the fork arms.

The bias exerted by the fork arms on the drive pin is intended to prevent clatter of the rotating drive pin between the fork arms, which clatter tends to occur after prolonged periods of use when the drive pin disengages from and impinges again on the boundary surface. On the one hand, such clatter is considered a disturbance by the user of the appliance, while on the other hand it conveys the impression that the appliance has a defect. The greater the relative spacing between the fork arms, that is, the longer the distance to be traveled by the drive pin until it impinges on the boundary surface, the louder the clatter.

The amount of clamping force or bias exerted by the fork arms is limited by the greatly increased power level necessary in the presence of an excessive bias. A significantly increased bias, that is, a narrow relative distance of the fork arms, causes an extraordinary increase in power loss due to increased friction of the drive pin between the fork arms, as is the case in particular when the drive pin approaches first the ends of the fork arms and is enclosed therebetween.

It will become apparent from the foregoing that the clamping force progressively increasing greatly along the slide slot from the second ends to the first ends of the fork arms, that is, the non-uniform pattern of the bias exerted on the drive pin by the fork arms, has a particularly adverse effect because the relative distance of the fork arms is not at random conformable to the drive pin because the disproportionately large clamping action between the first ends of the fork arms results in an excessive power loss.

The spring or cushioning means proposed in JP 4-82856 with the aim to reduce clatter of the drive pin between the fork arms are only a temporary remedy, because the basic problem of lack of adaptation possibilities of the fork arms to the drive pin is not solved. Moreover, it is anticipated that these additional means which involve greatly increased assembly work become plastically deformed after prolonged use, thus failing to eliminate clatter lastingly.

The present specification is directed to an embodiment of the device for converting the rotary motion of an eccentric into a reciprocating motion, in which the slide slot is arranged on the drive member, while the drive pin is arranged on the eccentric. It will be understood, however, that the same considerations apply also to an embodiment of the present invention in which the slide slot is provided on the eccentric and the drive pin is provided on the drive member.

It is an object of the present invention to improve upon a converter device of the type described in the foregoing by simple constructional means such that clatter is reliably avoided, while at the same time friction losses should be kept at a minimum.

The present invention relates to a converter device in which the circular motion is converted into a translational motion by a drive pin engaging a slide slot. The slide slot may be provided on the eccentric and the drive pin on the drive member, or alternatively, the drive pin may be arranged on the eccentric and the slide slot on the drive member. The embodiments described in the following refer to the latter alternative.

Contrary to the prior-art devices in which the slide slot is bounded by rigid members, in the solution of the present invention at least two flexurally elastic portions assuming the function of the fork arms against which the drive pin engages as the eccentric rotates are deflected by the drive pin at least in sections. A first end of each flexurally elastic portion is not deflectable, yet the deflectability of each flexurally elastic portion increases progressively towards its other second end. Each flexurally elastic portion has its first end connected with the drive member, while its second end projects freely. The flexurally elastic portions are preferably arranged in such a manner that their flexural rigidity increases in the acceleration area of the drive pin, that is, its deflectability decreases.

With the eccentric rotating, the drive pin acts on a respective one of the two flexurally elastic portions, nearly canceling out the bias of the flexurally elastic portion by deflecting it at least in sections from its original position. Because the two flexurally elastic portions are arranged in such a fashion that a rigid first and a deflectable second end of the flexurally elastic portions lie opposite each other at the ends of the slide slot, the two flexurally elastic portions exert a greatly evened out, preferably nearly uniform clamping force or bias on the drive pin along the full longitudinal extent of the slide slot.

This arrangement of the flexurally elastic portions enables the motor power to be significantly reduced while the bias is maintained unchanged, because the maximum clamping force to be overcome in the prior-art devices between the two first ends of the fork arms results in an undesirably high power loss. The present invention makes it possible to minimize the distance between the flexurally elastic portion and the drive pin with the eccentric rotating, such that clatter which becomes the louder the greater the distance between drive pin and boundary surface, is nearly completely eliminated. This results in a significant improvement of the converter device because the motor is dimensioned to lower power and/or clatter is avoided.

Each of the flexurally elastic portions has a first end thereof preferably secured to a cutout of the drive member by suitable fastening means as, for example, screws, or is integrally formed thereon, so that the second end of the respective portion projects freely into the cutout. The first ends of the flexurally elastic portions are each arranged at opposite ends of the cutout in the drive member, and the flexurally elastic portions extend in an opposed parallel relationship at a predetermined relative distance which, as described in the foregoing, is conformed to the diameter of the drive pin such that both portions engage against the drive pin with such a bias that the frictional forces occurring between the drive pin and the flexurally elastic portions are evened out to the maximum possible extent along the full length of the slide slot, in addition to being configured such as to enable the eccentric to be operated at a low power level. Apart from affording the advantage of enabling an overall lower bias to be selected as compared with prior-art devices, this arrangement has the advantage that the flexurally elastic portions engage against the drive pin more closely, thereby eliminating clatter.

The cutout into which the flexurally elastic portions extend may be provided at any desired location of the usually plate-shaped drive member. Depending on the design requirements of the individual appliance, the cutout may be provided at the end or in the center of the drive member, for example. Particularly in cases where the flexurally elastic portions are provided at the end, it is an obvious solution to arrange the two flexurally elastic portions so as to define a slide slot open on one end which facilitates the assembly of drive pin and drive member.

The flexurally elastic portions are either configured as a separate component secured to the drive member during the assembly operation, or they are integrally formed with the drive member preferably in cases where the drive member is made of a plastics material. The drive member and the flexurally elastic portions may be manufactured from the same material, where applicable, in one single operation. The flexurally elastic portions may be made of any material of sufficient flexural elasticity, preferably, however, of metal or plastics. The flexurally elastic portions may be of a leaf- or rod-shaped configuration, depending on the design requirements of the appliance.

The drive member effecting the reversal of motion is required to include at least one rigid component for transmitting the motion. This rigid component is conventionally configured in the shape of a plate on which are arranged the flexurally elastic portions and, where applicable, an output means for an implement as, for example, an inner cutter of a shaver or a toothbrush attachment, and a mounting means for the drive member on the housing of the individual appliance in which the converter device is utilized. If required by the stability of the converter device, the rigid component of the drive member may also be configured as a frame structure. In the event of the rigid component of the drive member being a frame structure (drive frame), the flexurally elastic portions may be arranged on a drive arm secured to the drive frame.

In a further embodiment, the flexurally elastic portions are provided in the plane of the drive member, the plate-shaped configuration of the drive member or drive arm being thus maintained.

In another embodiment, the flexurally elastic portions extend away from or towards the drive member or drive arm at right angles thereto. In this arrangement, for example, the first flexurally elastic portion has its first end formed on the drive member, while its second end extends away from the drive member. Extending parallel to the first flexurally elastic portion is a rigid wall member on whose free end, that is, the end remote from the drive member, the first end of the second flexurally elastic portion is formed. The second flexurally elastic portion is in parallel arrangement immediately opposite the first flexurally elastic portion, with the free second end of this second flexurally elastic portion pointing in the direction of the drive member. This provides between the first and the second flexurally elastic portion a slide slot having one end open and adapted for engagement with the drive pin.

The solution of the present invention which comprises the step of limiting the slide slot by at least two flexurally elastic portions affords ease of implementation because the flexurally elastic portions can be either integrally formed on the drive member or simply mounted as by plug or screwed connections, for example. The provision of additional components such as cushioning or damping means is obviated. The assembly of drive member and eccentric is also easy because the drive pin can be introduced into the slide slot without particular effort. The flexurally elastic portions allow a production with sufficient tolerance because the bias predetermined by the relative distance of the flexurally elastic portions is variable within the scope of the manufacturing tolerances, and minor fluctuations in the relative distance of the two flexurally elastic portions, as for example, manufacturing tolerances, accordingly have no effect on the serviceability of the converter device.

In a particularly preferred embodiment, the drive member is a component part of an oscillator, in particular an oscillator having two elastic legs between which at least one rigid basic member configured in plate shape or as a frame structure is arranged, with the drive member being connected with the basic member. The drive member may be secured to the basic member by fastening means, or alternatively, it may be integrally formed on the basic member. The elastic legs of the oscillator configured, for example, as film hinges, serve the function of supporting and securing the oscillator on the housing of the individual appliance. The drive member may be provided at any desired location on the oscillator, centrally or at the end, depending on the design requirements of the appliance. Thus, for example, the drive member may be arranged so that one end thereof is arranged at one end of the basic member outside the elastic legs in the manner of a drive arm of the oscillator.

In a particularly preferred improved embodiment of the present invention, clatter is avoided or reduced after prolonged use particularly by providing spring means 80, 82 for supporting the flexurally elastic portions. The spring means are preferably arranged in the areas of maximum deflection between the flexurally elastic portions and the drive member.

Where necessary, it is readily possible according to the present invention to couple several drive members to each other, for example, when it is desired to operate a multi-part oscillator whose various parts are deflected in opposite directions. Thus, for example, it is envisaged that several drive pins arranged on various serially-connected eccentric disks may be rotated within respective slide slots in mating arrangement with the drive pins.

Some embodiments of the present invention will be described in detail in the following with reference to the accompanying drawings. In the drawings, FIG. 1 is a view of a converter device illustrating a first embodiment of the present invention;

Figure 1:
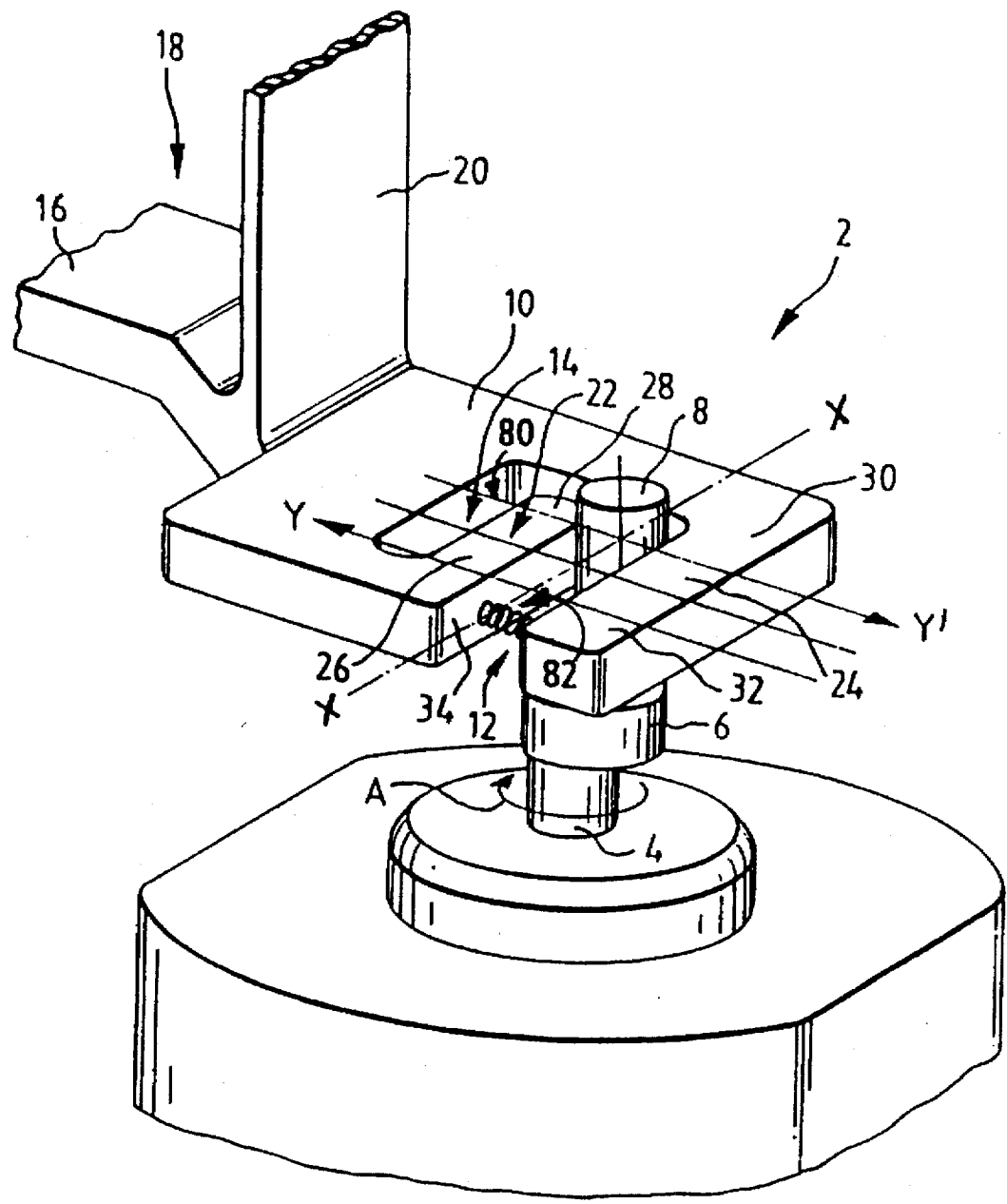

For the subsequent explanation of the converter arrangement of the present invention, reference will first be made to FIG. 1. FIG. 1 illustrates a device 2 for converting the rotary motion A of an eccentric 6 driven by a motor shaft 4 into a reciprocating motion parallel to a first direction y–y'. Mounted on the eccentric disk 6 in an extension of the motor shaft is a drive pin 8 projecting into a slide slot 12 formed in the drive member 10.

The drive member 10 is a plate of plastics or metal, for example, which includes a cutout 14 and has one end thereof formed on the rigid basic member 16 of an oscillator 18 in the manner of a drive arm. The oscillator is suspended by means of the film hinge 20. Such an oscillator 18 is conventionally part of a small appliance powered by an electric motor as, for example, a shaver or a dental cleansing device.

Further formed on the drive member are two flexurally elastic portions 22 and 24. The first portion 22 has its first end 26 formed on the drive member, while its second free end 28 extends into the cutout 14. On the opposite side of the cutout 14, the first end 30 of the second portion 24 is formed on the drive member 10. The second end 32 of this portion 24 provides the boundary for the cutout 14. The two flexurally elastic portions 22 and 24 extend parallel to each other in opposite directions, so that the first end of the one portion lies opposite the second end of the other portion. Thus, the first end 26 of the portion 22 lies opposite the second end 32 of the second portion 24, while the first end 30 of the second portion 24 lies opposite the second end 28 of the first portion 22. Arranging the flexurally elastic portions 22 and 24 in this manner provides a slide slot 12 having one end open through which the drive pin 8 is insertable for assembly.

The facing surfaces of the two portions 22 and 24 are referred to as boundary surfaces 34, and the space bounded by the boundary surfaces 34 is referred to as the slide slot 12. The relative distance of the two portions 22 and 24 is smaller than the diameter of the drive pin 8, causing the drive pin to be clampingly engaged by the flexurally elastic portions 22 and 24 with a predetermined bias. The length of the slide slot 12 in the direction of its longitudinal axis x—x is at least double the relative distance of the drive pin 8 to the axis of the motor shaft 4. This thus ensures that the drive pin is guided in the slide slot 12 by the portions 22 and 24 in any position of the eccentric.

The drive pin 8 describes a circular motion which the drive member follows in that the drive pin 8, which rolls along the boundary surfaces 34, exerts pressure on the drive member, whereby this circular motion is converted into a translational, reciprocating motion. Apart from the translational motion of the drive member, the portions 22 and 24 are deflected at least in sections by the circular motion of the drive pin. The circular motion of the drive pin 8 counteracts the bias exerted on it by the flexurally elastic portions. This bias is canceled out at least in part by the drive pin deflecting the flexurally elastic portions 22 and 24 from their original positions at least in sections.

Owing to the configuration of the slide slot 12 of the present invention, it is possible to minimize and to even out largely the bias exerted by the flexurally elastic portions 22 and 24 on the drive pin 8, and thus the friction between the pin and the flexurally elastic member, through the entire slide travel, that is, through the entire circular path of the drive pin 8. Apart from minimizing the bias, it is thereby accomplished that the flexurally elastic portions 22 and 24 engage against the drive pin more closely so that clatter is avoided.

Further embodiments of the converter device of the present invention will be presented in the following. Like reference numerals identify like parts.

Figure 2:
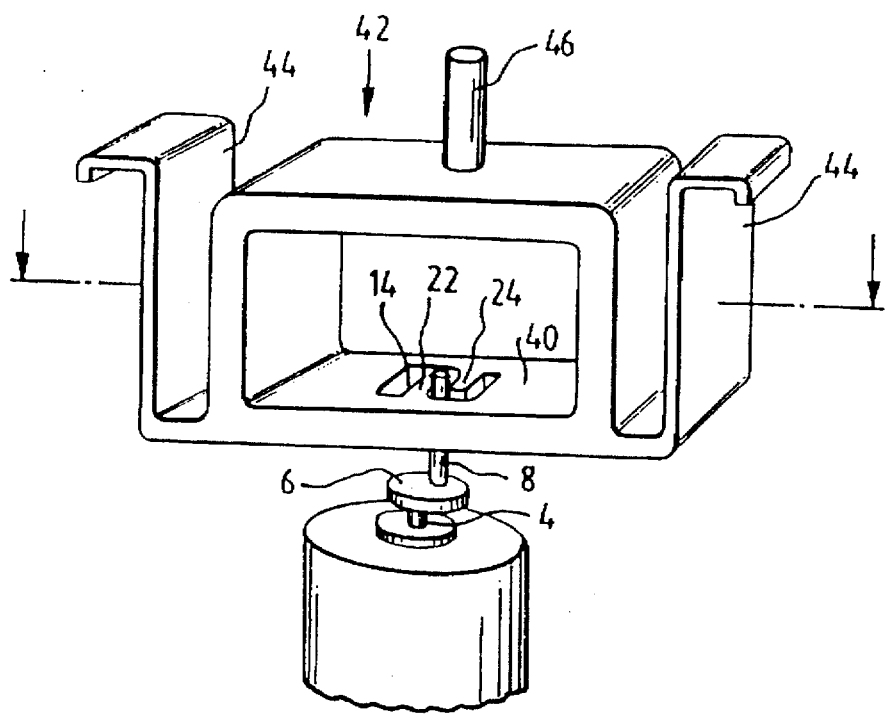
FIG. 2 is a view of the converter device illustrating a second embodiment of the present invention.

FIG. 2 illustrates a second embodiment of the converter device of the present invention. The drive member is made integrally with the rigid basic member 40 of an oscillator 42, the basic member being configured as a frame structure. The oscillator is movably carried in an appliance by means of two film hinges 44. An output means 46 for an implement is provided on the frame structure on the surface facing away from the eccentric.

In the surface of the frame structure opposite the eccentric 6, a cutout 14 has been provided for the integrally formed drive member. Extending into the cutout 14 from opposite ends are two parallel, relatively spaced flexurally elastic portions 22 and 24. The respective second ends of these portions extend freely into the cutout 14 and are deflectable by the drive pin 8. In the embodiment shown, the two portions 22 and 24 form a closed slide slot 12 on the boundary surfaces of which the drive pin 8 rolls as it travels along its circular path.

The embodiment illustrated in FIG. 2 affords particularly great ease of manufacture and assembly. Its components and space requirements are restricted to a minimum.

Figure 3:
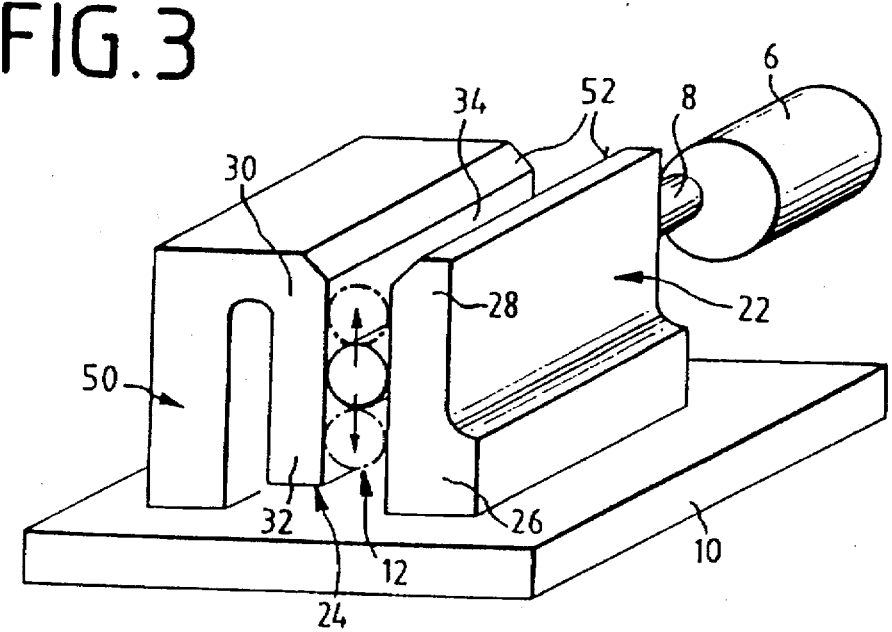
FIG. 3 is a view of the converter device illustrating a third embodiment of the present invention.

FIG. 3 shows a further embodiment of the converter device of the present invention in which the flexurally elastic portions 22, 24 extend away from the surface of the drive member 10. The first portion 22 has its first end 26 anchored to the drive member 10 and extends at right angles thereto so that the second end 28 projects freely. In relatively spaced parallel arrangement thereto is a rigid wall member 50 which is equally anchored to, and extends away from, the drive member 10. Secured to the freely projecting end of this rigid wall member 50 is the first end 30 of the second flexurally elastic portion 24. The second portion 24 extends between the rigid wall member 50 and the first flexurally elastic portion 22 towards the drive member 10. The second end 32 of the second portion 24 terminates, however, short of the drive member 10 in a freely projecting fashion. As in the embodiments of the present invention previously described, the slide slot 12 is formed by the portions 22 and 24 as a slide slot 12 having one end open. The drive pin 8 extends between the two flexurally elastic portions 22 and 24 and is guided within the slide slot 12 by the two portions 22 and 24 on the boundary surfaces 34 as it travels along its circular path which the drive member converts into a reciprocating motion.

The rigid wall member 50 and the second flexurally elastic portion 24 may be made of different materials (metal and plastics, various plastics materials or metals), or alternatively, they may be made of like material, yet of different thickness, for example.

In order to simplify the insertion of the drive pin, the flexurally elastic portions 22 and 24 include each a chamfered guide surface 52 at the open end of the slide slot.

Figure 4:
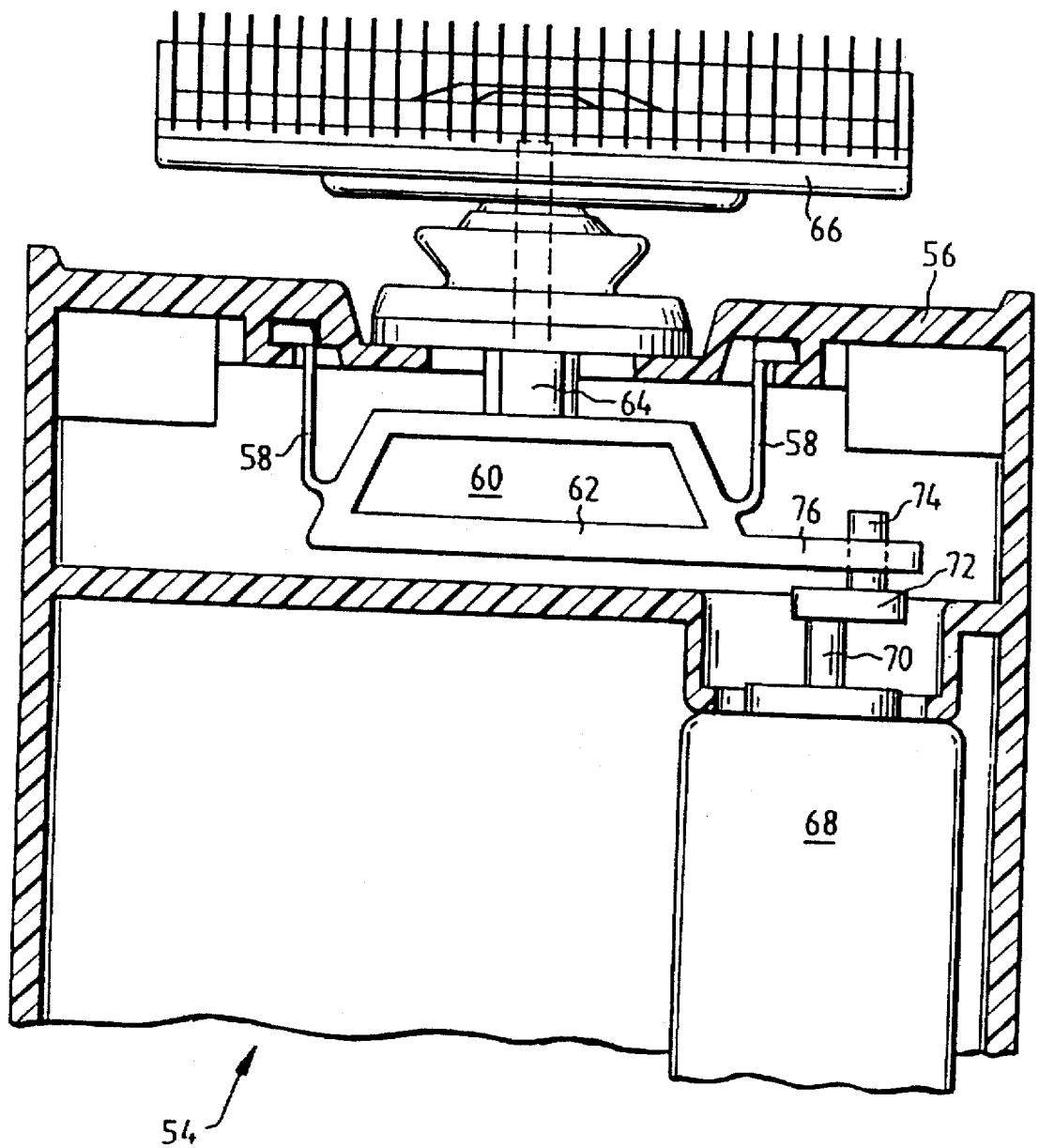
FIG. 4 is a sectional view of a shaver including an oscillator on which a drive arm having a flexurally elastic member is arranged.

FIG. 4 shows a shaver 54 with a housing 56 in which an oscillator 60 is movably carried by means of film hinges 58. The oscillator 60 includes a frame structure 62 providing a rigid basic member on which an output means 64 is formed. The shaver 54 has an inner cutter 66 mounted on the output means 64. The shaver 54 further includes an electric motor 68 having a motor shaft 70 on which an eccentric disk 72 is provided carrying a drive pin 74 aligned parallel to the axis of the motor shaft 70.

The eccentric 72 and the oscillator 60 are in relative engagement by means of the drive pin 74 engaging with a flexurally elastic member provided in a drive arm 76 formed on the frame structure 62 of the oscillator 60. The arrangement of drive pin and flexurally elastic member is as shown in FIG. 1. The drive arm 76 is disposed outside the film hinges 58 because the motor and thus also the eccentric are arranged off-center in the shaver housing. As becomes apparent from FIG. 3, the possibility also exists to arrange the flexurally elastic member centrally on the basic member of the oscillator if the motor is mounted at center in the shaver housing.

I claim:

1. A personal care device, comprising:

a personal care implement, and a driver for converting rotary motion of a motor shaft to translational motion for driving the personal care implement, said driver including an eccentric arranged to be driven by the motor shaft, a drive member including first and second flexurally elastic portions defining a slide slot, and a drive pin at least partially located within said slide slot such that said drive pin deflects the flexurally elastic portions at least in sections as the eccentric rotates, one of said drive member and said drive pin being coupled to said eccentric and the other of said drive member and said drive pin being coupled to the personal care implement to be driven, wherein each of said first and second flexurally elastic portions includes a non-deflectable first end and a deflectable second end, the deflectability of each flexurally elastic portion increasing from said non-deflectable first end to said deflectable second end, said first and second flexurally elastic portions being arranged with said non-deflectable first ends lying opposite said deflectable second ends.

2. The personal care device of claim 1 wherein the deflectability of each flexurally elastic portion increases progressively from said non-deflectable first end to said deflectable second end.

3. The personal care device of claim 1 wherein said translation motion for driving the personal care implement is in a first direction, and said slot extends transversely to the first direction.

4. The personal care device of claim 1 wherein said flexurally elastic portions are aligned parallel to each other.

5. The personal care device of claim 1 wherein said slide slot defined by said flexurally elastic portions includes an open end.

6. The personal care device of claim 1 wherein said drive member further includes a drive plate.

7. The personal care device of claim 6 wherein said drive plate lies in a plane and said flexurally elastic portions are arranged in the plane of the drive plate.

8. The personal care device of claim 7 wherein said drive plate includes a cutout into which said flexurally elastic portions extend, each of said flexurally elastic portions extending from an opposite end of said cutout, such that said flexurally elastic portions are arranged at a relative distance and extend parallel to each other in opposite directions.

9. The personal care device of claim 6 wherein said drive plate lies in a plane and said flexurally elastic portions are arranged to extend out of the plane of the drive plate.

10. The personal care device of claim 9 further including a rigid wall member attached to said drive plate and extending out of the plane of said drive plate, said first flexurally elastic portion being attached to said drive plate and arranged parallel to said rigid wall member, said second flexurally elastic portion being attached to said rigid wall member at an end of the rigid wall member remote from the drive plate, said second flexurally elastic portion being arranged parallel to and spaced from the rigid wall member, said second flexurally elastic portion lying opposite said first flexurally elastic portion, thus providing the slide slot between said flexurally elastic portions.

11. The personal care device of claim 1 wherein said drive member is a component part of an oscillator.

12. The personal care device of claim 11 wherein said oscillator includes an elastic film hinge and a rigid basic member connecting said elastic film hinge, said drive member being connected to said at least one rigid basic member.

13. The personal care device of claim 12 further including a second elastic film hinge, said drive member being centrally arranged between said elastic film hinges.

14. The personal care device of claim 12 wherein said drive member has one side thereof arranged at one end of the basic member outside said elastic film hinge.

15. The personal care device of claim 1 further including a spring for supporting said flexurally elastic portions.

16. The personal care device of claim 1 wherein said flexurally elastic portions are aligned such that the deflectability of each flexurally elastic portion decreases in an acceleration area of said drive pin.

* * * * *